C. J. LEHMAN, Jr.
UNIVERSAL SOLDERING CUP.
APPLICATION FILED MAR. 1, 1917.
1,359,260.
Patented Nov. 16, 1920.
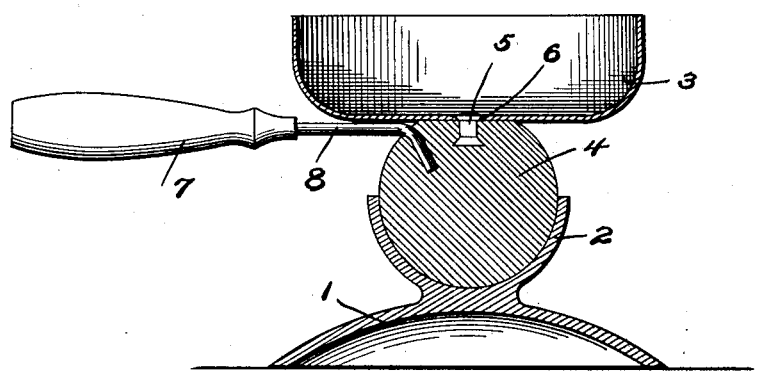
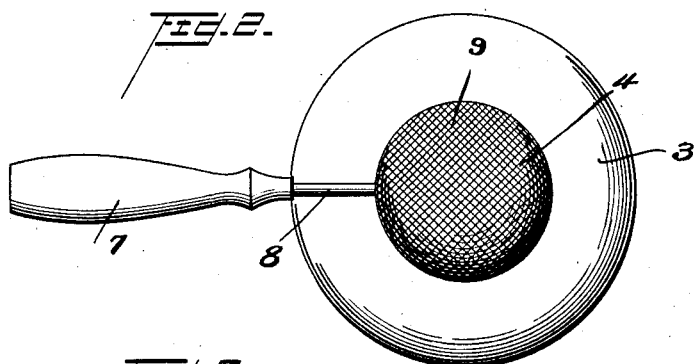
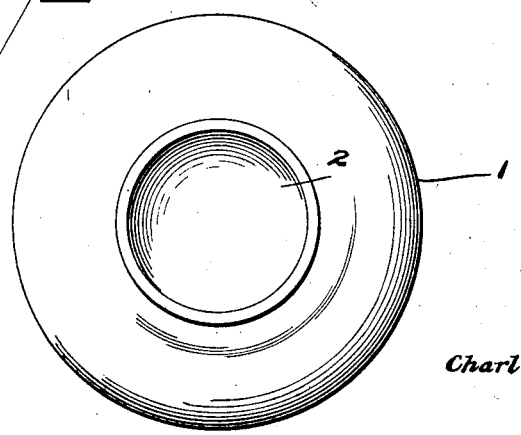
Witness
Harold Strauss
Inventor
Charles J. Lehman, Jr.
By Samuel W. Foster
his Attorney

UNITED STATES PATENT OFFICE.

CHARLES J. LEHMAN, JR., OF PHILADELPHIA, PENNSYLVANIA.

UNIVERSAL SOLDERING-CUP.

1,359,260.   Specification of Letters Patent.   Patented Nov. 16, 1920.

Application filed March 1, 1917. Serial No. 151,794.

*To all whom it may concern:*

Be it known that I, CHARLES J. LEHMAN, Jr., a citizen of the United States, residing at Philadelphia, in the county of Philadelphia and State of Pennsylvania, have invented certain new and useful Improvements in Universal Soldering-Cups, of which the following is a specification.

My invention relates to improvements in universal soldering cups, the object of the invention being to provide a soldering cup which can be readily tilted to any angular position, and which will remain in the position to which it is moved, so as to insure a proper running of the solder, leaving both hands free for the manipulation of the instruments used in connection with the work to be done.

A further object is to provide a soldering cup of the character stated, which can be manufactured and sold at a reasonably low price, and which will greatly facilitate the work of soldering, especially in connection with dental work, although the cup may be put to various other uses.

With these and other objects in view the invention consists in certain novel features of constructions and combinations and arrangements of parts as will be more fully hereinafter described and pointed out in the claim.

In the accompanying drawings:

Figure 1 is a view in vertical section, illustrating my improved universal soldering cup.

Fig. 2 is an inverted plan view of the cup removed from its supporting base, and Fig. 3 is a top plan view of the supporting base.

1 represents a supporting base which is of the necessary weight and width to provide the proper support. The base 1 is provided centrally with a socket 2, the latter being of hemi-spherical shape, and smaller in diameter than the diameter of base 1.

3 represents my improved cup which is supported by, and secured to a relatively heavy ball 4. This ball 4 fits the socket 2, and is provided on its outer face with a roughened surface 9, which may be formed by milling or otherwise, so as to present a frictioned surface to the inner face of socket 2. The cup 3 is preferably secured to the ball 4 by means of a rivet 5, the latter molded into the metal of the ball and projecting through an opening 6 in the center of cup 3 and offset at its upper end.

7 represents a handle which is provided with a shank 8 extending into and preferably molded in the ball 4, so as to effectually secure the handle and ball together.

In operation, the article to be soldered is placed in the cup 3, and the latter tilted to the necessary angle by means of handle 7. As the ball 4 and socket 2 are of bulbous or spherical shape, the cup can be tilted to any angle in any direction, and by reason of the frictional engagement of the ball in the socket, the cup will remain in the position to which it is moved.

Not only are the size and weight of the ball desirable as giving an advantageous frictional engagement with the socket upon a large radius but the low-lying character of the cup used with it is also advantageous in reducing the leverage of any article in the cup or any pressure exerted against it.

This leaves the operator's hands free to manipulate a blow-pipe, and also position the gold or other material to be soldered and rely upon the angular disposition of the cup to cause the gold to run in the right direction to do the best possible work.

Various slight changes may be made in the general form and arrangement of parts described without departing from my invention, and hence I do not limit myself to the precise details set forth, but consider myself at liberty to make such changes and alterations as fairly fall within the spirit and scope of the appended claim.

Having fully described my invention what I claim as new and desire to secure by Letters Patent is:

A soldering cup comprising a base having a relatively large hemi-spherical socket thereon, a relatively large and heavy ball fitting the socket, a cup on the ball, a rivet embedded in the ball, and securing the cup thereto, and a handle having one end embedded in the ball, said ball having a roughed surface engaging the entire surface of the socket.

In testimony whereof I have signed my name to this specification in the presence of two subscribing witnesses.

CHARLES J. LEHMAN, JR.

Witnesses:
  OTTO E. LEHMAN,
  ELEANOR F. MURRAY.